United States Patent [19]

Nishi et al.

[11] 3,964,859

[45] June 22, 1976

[54] VAPORIZING TYPE LIQUID FUEL COMBUSTION APPARATUS

[75] Inventors: Atsuyoshi Nishi; Isamu Kawabuchi; Katuo Yashiro, all of Nakatsugawa; Kenichi Ono; Yoshiaki Furuya, both of Kamakura, all of Japan

[73] Assignee: Mitsubishi Denki Kabushiki Kaisha, Tokyo, Japan

[22] Filed: Mar. 10, 1975

[21] Appl. No.: 557,094

[30] Foreign Application Priority Data

Mar. 11, 1974 Japan.......................... 49-29101[U]
Mar. 11, 1974 Japan.......................... 49-29100[U]
Mar. 11, 1974 Japan.............................. 49-28737
Mar. 11, 1974 Japan.......................... 49-29102[U]

[52] U.S. Cl.................................. 431/78; 431/1; 431/63; 236/15 B
[51] Int. Cl.²............................................ F23H 1/00
[58] Field of Search............... 431/1, 63, 74, 78, 80, 431/90; 236/15 B

[56] References Cited
UNITED STATES PATENTS

| | | | |
|---|---|---|---|
| 2,319,708 | 5/1943 | Fukao............................ | 317/249 R |
| 2,685,917 | 8/1954 | Perry.................................... | 431/63 |
| 3,219,095 | 11/1965 | Nilsson .................................. | 431/1 |

FOREIGN PATENTS OR APPLICATIONS

| | | | |
|---|---|---|---|
| 1,236,674 | 6/1960 | France................................... | 431/1 |

Primary Examiner—Carroll B. Dority, Jr.
Attorney, Agent, or Firm—Oblon, Fisher, Spivak, McClelland & Maier

[57] ABSTRACT

A vaporizing type liquid fuel combustion keyboards is disclosed which is particularly suitable for heating individual rooms and which includes a fuel supply system capable of delivering very small volumes of fuel reliably and without the need for excessively complicated components. The apparatus includes an intermittently driven electric fuel pump which is controlled by a flame detector for the the fuel feed at a proper level. An adjustable damper is also provided in the combustion air supply system for regulating the air flow delivered to the combustion apparatus, and is coupled to the fuel feed system for coordinating control thereof. bridge irregularities

4 Claims, 7 Drawing Figures

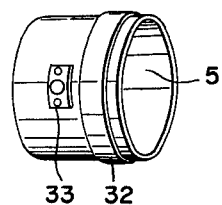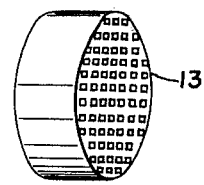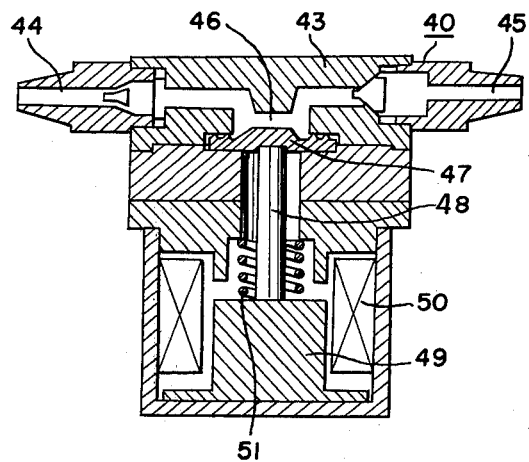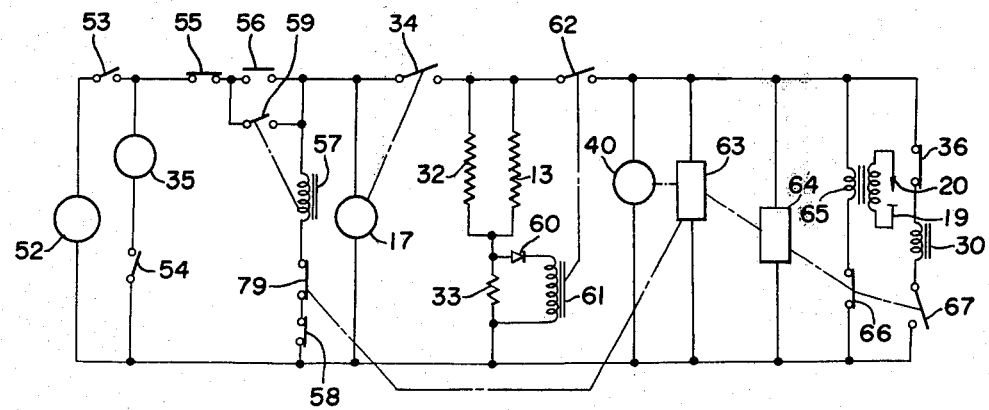

VAPORIZING TYPE LIQUID FUEL COMBUSTION APPARATUS

BACKGROUND OF THE INVENTION

1. Field of the Invention

The present invention relates generally to vaporizing type liquid fuel combustion devices and more particularly to compact liquid fueled heating devices.

2. Description of the Prior Art

In general, pot or core type liquid fuel combustion apparatuses which directly burn a liquid fuel have disadvantages in that they form soot, are noisey and produce unstable combustion. On the other hand, the vaporizing type combustion apparatuses wherein a liquid fuel (e.g. kerosene) is vaporized in a vaporizer and mixed with air for combustion and the mixed combustible gas is injected into a combustion chamber, have complicated structures, but not the other mentioned disadvantages. Accordingly, the latter have been used for large size hot air heating apparatuses such as boilers and the like.

Vaporizing type liquid fuel combustion apparatuses have equipment for forcibly feeding a liquid fuel with an electric pump to a vaporizer. Accordingly, it has been difficult to maintain relatively low heating coefficients such as 8000 – 2000 Kcal/hour, and the vaporizing type liquid fuel combustion apparatuses have not been used in practice for compact hot air heating apparatuses used in small rooms which should have relatively low heating coeffcients. For example, for a heating coefficient of about 4000 Kcal/hour using kerosene as the fuel having a calorific value of 8000 Kcal/liter the required quantity of the liquid fuel to be delivered by an electric pump is as follows:

500 cc/hour =8.3 cc/minute = 0.15 cc/second.

In order to forcibly feed this small amount of the liquid fuel with a capacitive reciprocating pump driven by applying a half-wave recitifed 50 cycle commercial AC voltage, 0.15 cc of the liquid fuel is fed by 50 strokes and accordingly only 0.003 cc of the liquid fuel is fed by one cycle of the plunger. It has been hard to commercialize an electric pump having such a remarkably low feed rate and yet which has a simple structure and low cost from the viewpoint of mechanical structure.

SUMMARY OF THE INVENTION

Accordingly, it is one object of the present invention to provide a vaporizing type liquid fuel combustion apparatus which can be used for a compact hot air heating apparatus having a relatively low heating coefficient of between 8000 – 2000 Kcal/hour by feeding a liquid fuel at an average feed rate of about 0.3 – 0.08 cc/second.

Another object of the invention is to provide a vaporizing type liquid fuel combustion apparatus which comprises a flame detector for detecting a flame in a combustion chamber, the flame detector acting as an ignition control element for intermittently driving an electric fuel pump, whereby the fuel feed rate is automatically controlled to be desirable rate.

Briefly, these and other objects of the invention are achieved by providing a vaporizing type liquid fuel combustion apparatus which comprises a flame detector for detecting a flame in a combustion chamber for actuating an ignition control element by a suitable signal from the flame detector. A damper is provided in a combustion air passage between a blower and a vaporizer located at the combustion chamber. The fuel feed rate is automatically controlled by appropriate adjustments of the damper, whereby the combustion flame can easily be reduced from a normal level to a pilot flame. The flame detector also controls an electric pump for feeding the liquid fuel to the combustion chamber. A temperature detector is provided for detecting the temperature of a heated element so as to automatically control the combustion air flow depending upon the temperature of the heated material, and simultaneously to automatically control the fuel feed rate depending upon the air feed rate whereby the temperature of the heated material is kept at a predetermined level.

BRIEF DESCRIPTION OF THE DRAWINGS

Various other objects, features and attendant advantages of the vaporizing type liquid fuel combustion apparatus of the present invention will be more fully appreciated from the following detailed description when considered in connection with the accompanying drawings, wherein:

FIG. 2 is a schematic view of a preheater;

FIG. 3 is a schematic view of a vaporizer;

FIG. 4 is a sectional view of an electric pump for fuel feed;

FIG. 5 is a schematic diagram of the complete electric circuit for a heating apparatus;

DETAILED DESCRIPTION OF THE PREFERRED EMBODIMENTS

Figure 1:
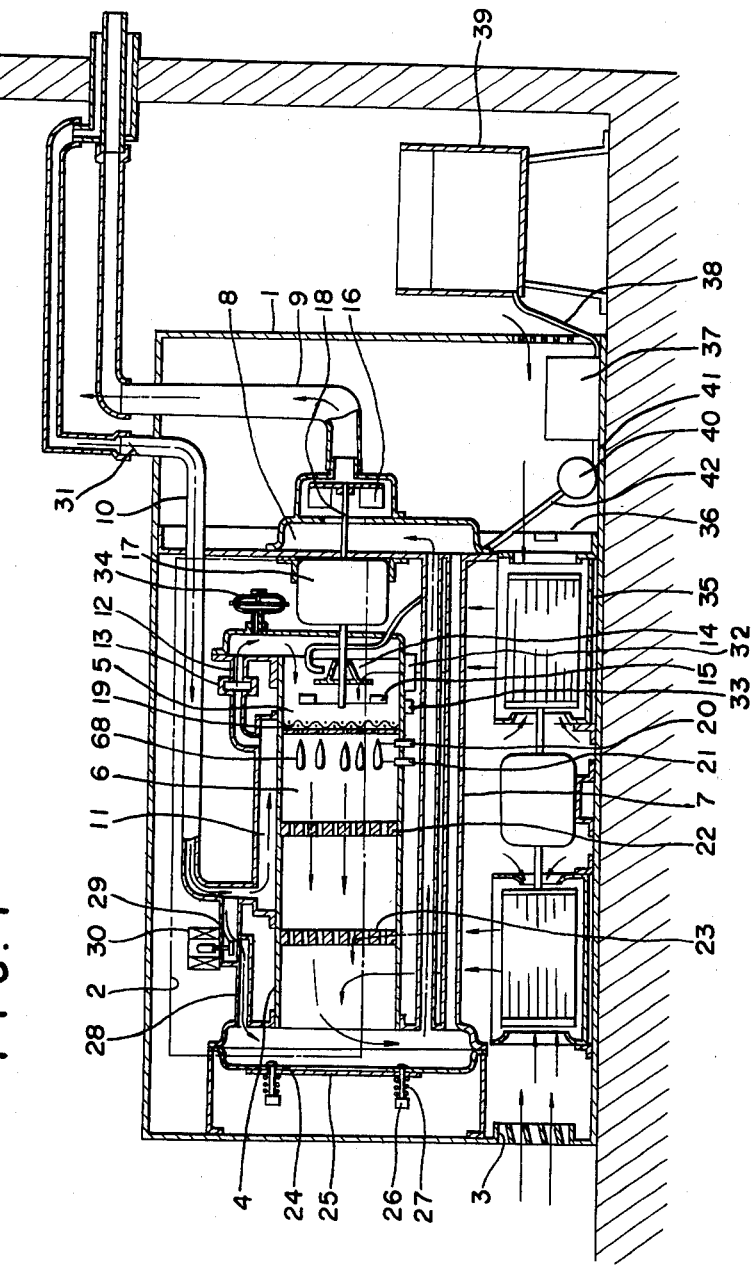
FIG. 1 is a schematic sectional view of the mechanical structure of a hot air heating apparatus equipped with one embodiment of the invention.

Referring now to the drawings, wherein like reference numerals designate identical or corresponding parts throughout the several views, and more particularly to FIG. 1 thereof, a schematic sectional view of a hot air heating apparatus used in a home room is shown which is equipped with one embodiment of the vaporizing type liquid fuel combustion apparatus of the invention. In FIG. 1, the reference numeral 1 designates a casing of the hot air heating apparatus which has an air outlet 2 at the upper front portion and an air inlet 3 at the lower side portion. The numeral 4 designates a combustion cylinder placed in the center of the casing 1 and oriented in the horizontal direction. A vaporizing chamber, and a combustion chamber 6 are formed in the combustion cylinder and occupy its entire length. The numeral 7 designates a multi-pipe type heat-exchanger disposed in parallel with the combustion cylinder, one end of the heat-exchanger communicating with a top wall of the combustion chamber 6 opposite the vaporizing chamber 5. The numeral 8 designates an exhaust gas unit connected to one end of the heat-exchanger which is disposed to face the vaporizing chamber 5 and is connected to an exhaust gas pipe 9 for removing exhaust gases to the atmosphere. The numeral 10 designates an inlet pipe for air, one end of which is opened to the atmosphere. The numeral 11 designates a preheating unit for preheating air which is disposed at the outer wall of the combustion chamber 6 and is connected to the other end of the inlet pipe 10. The numeral 12 designates a connecting pipe for connecting the preheating unit and the vaporizing chamber 5, which includes a preheater 13. The preheater has many communicating holes in the cylindrical body thereof to provide positive temperature characteristic resistance material(PTC)as shown in FIG. 2.

The reference numeral 14 designates a rotary plate disposed in the vaporizing chamber 5 and the number 15 designates mixing fan blades. The number 16 designates exhaust fan blades for expelling exhaust gases. The numeral 17 designates a motor and both ends of the motor shaft project through the walls to the vaporizing chamber and the exhaust gas unit 8. The rotary plate 14, the mixing blades 15 and exhaust blades 16 are fitted on the projecting ends of the motor shaft. The numeral 19 designates flame holes disposed between the vaporizing chamber 5 and the combustion chamber 6. The numerals 20 and 21 designate an ignition electrode and a flame detecting electrode which face a predetermined gap in the flame holes at the side of the combustion chamber. The numerals 22 and 23 designate combustion plates having many holes which are disposed in the combustion chamber 6. The numeral 24 designates a through hole disposed at the top wall of the combustion chamber 6 and 25 designates an explosion buffer plate enclosing one end of the combustion chamber. The peripheral portion of the buffer plate is coupled to the wall of the combustion chamber 6 with pins 26 and is resiliently biased toward the outer wall of the combustion chamber 6 by springs 27 connected to the pins 26 to provide an air-tight contact.

The reference numeral 28 designates a by-pass pipe for connecting the air inlet pipe 10 and the top of the combustion chamber 6, while 29 designates a valve disposed in the by-pass pipe and the numeral 30 designates an electromagnetic coil for controlling the valve. The numeral 31 designates a switch damper disposed in the end of the air inlet pipe 10 in the side the combustion air inlet. The numerals 32 and 33 designate a vaporizing heater and a temperature detector which are contacted with the outer wall of the vaporizing chamber 5 and are formed of a PTC (positive temperature characteristic resistance material).

The heater for vaporizing 32 is fitted on the outer wall of the combustion chamber and has a thin annular shape as shown in FIG. 3. The reference numeral 34 designates a pressure switch communicating with the vaporizing chamber 5 and 35 designates a blower for recycling room air which is disposed at the lower part of the casing 1. The numeral 36 designates a room air temperature detector disposed at the air inlet of the blower and 37 designates a fuel leveling device which is connected through a fuel pipe 38 to the fuel tank 39. The numeral 40 designates an electric fuel feed pump which is connected through a connecting pipe 41 to the fuel leveling device and 42 designates a fuel feed pipe 1, one end of which is connected to the pump and the other end of which opens above the rotary plate 14.

The structure of the electric fuel feed pump 40 will be described in more detail referring to FIG. 4. In FIG. 4, the reference numeral 43 designates a pump body, 44 designates an inlet and 45 designates an outlet, the inlet being connected to the connecting pipe 41 and the outlet being connected to the oil feed pipe 42. The numeral 46 designates a compression space formed between the inlet and the outlet and 47 designates a diaphragm which forms one wall of the compression space. The numeral 48 designates a piston rod which is movable in the pump body 43, one end of the piston rod being connected to the diaphragm. The numeral 49 designates a movable iron core which is connected to the other end of the piston rod, 50 designates an electromagnetic coil surrounding the iron core and 51 designates a spring for pressing the piston rod 48 to the rear direction.

FIG. 5 shows an electric control circuit for a hot air heating apparatus having the above-mentioned structure. In FIG. 5, the reference numeral 52 designates a commercial AC power source which is connected through a main switch 35 and a delay switch 54 to the blower 35. The numerals 55, 56, 57 and 58 designate respectively a normally ON switch, a normally OFF switch, a first relay coil and a vibration sensitive switch which are connected in series with each other and in parallel with the blower and the delay switch. A self holding contact 59 of the first relay coil 57 is connected in parallel across the normally OFF switch 56. The motor 17 is connected in parallel to the first relay coil 57 and the vibration sensitive switch 58.

The pressure switch 34, the preheater 13, and the temperature detector 33 are connected in series with each other and the preheater 13 is connected in parallel with the vaporizing heater 32.

The reference numerals 60 and 61 designate a diode and a second relay coil which are connected in parallel with the temperature detector 33. The electric fuel feed pump 40 is connected through a normally OFF switch 62 to the second relay coil, the preheater 13 and the temperature detector 33. The reference numerals 63 and 64 designate a pump control element and a timer element which are connected to the electric fuel feed pump. The numeral 65 designates an ignition discharge transformer primary winding which is connected through a normally ON switch 66 to the timer element 64. The secondary winding of the transformer is connected to the flame hole plate 19 and the ignition electrode 20, and is also connected through a normally ON switch 67 to the electromagnetic coil 30 and the room temperature detector switch 36.

Figure 6:
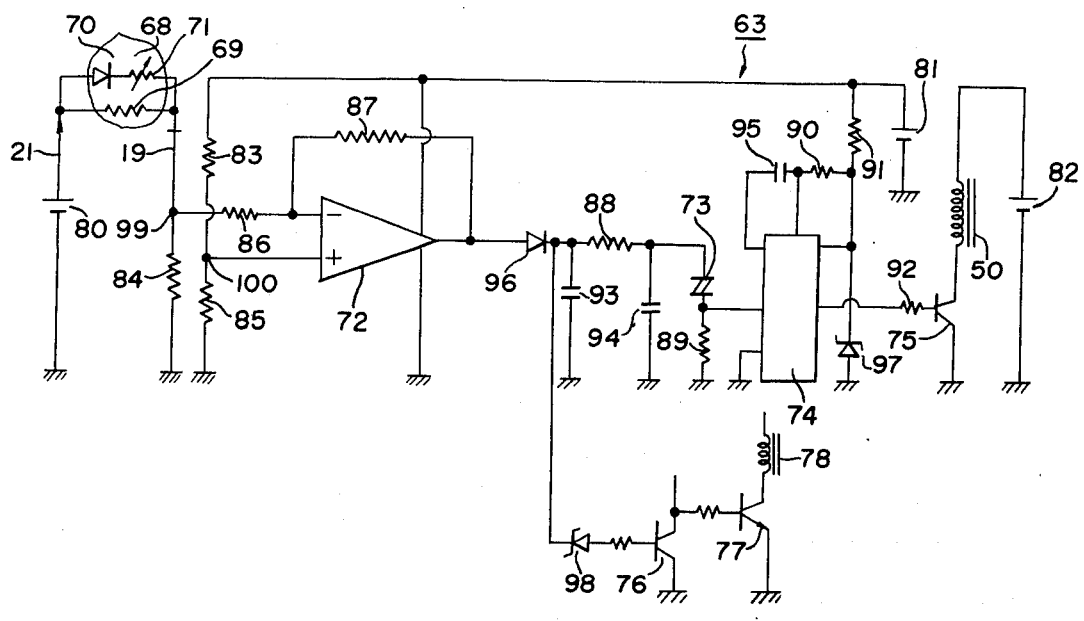
FIG. 6 is an electric circuit of one embodiment of a pump control element in the circuit of FIG. 5; and, FIG. 7 is a graph showing the relation between the change of the flame current relative to the condition of the flame in the circuit of FIG. 6.

The pump control element 63 has the circuit shown in FIG. 6. In FIG. 6, the reference numeral 68 designates a flame formed between the flame detecting electrode 20 and the flame hole plate 19 which are considered to be equivalent to the resistance 69, the diode 70 and the variable resistance 71. The reference numeral 72 designates an operational amplifier connected in series to the resistance, the diode and the variable resistance, 73 designates an SBS, 74 designates monostable multi-vibrator and 75 a transistor. The electromagnetic coil 50 of the electric fuel feed pump is connected through the transistor 75. The reference numerals 76 and 77 designate transistors connected to the operational amplifier 72, and a third relay coil 78 is connected through the transistor 77 to a power source. A contact 79 controlled by the relay coil is connected between the vibration sensitive switch 58 and the first relay coil 57. The reference numerals 80–82 designate power sources, 83–92 designate reistors, 93–95 designate capacitors, 96 designates a diode and 97 and 98 designate constant voltage(Zener)diodes.

The operation of the heating apparatus of the present invention will now be described in detail. In FIG. 5, electric current is fed to the first relay coil 57, the contact 79 and the vibration sensitive switch 58 by turning on the main switch 53 and pushing the normally OFF switch 56 to turn it on, whereby the self-holding contact 59 of the first relay coil 57 is turned on. At the same time, the motor 17 is driven to rotate the blades of the exhaust fan 16, the rotary plate 14 and the mixing fan 15 whereby air for combustion is drawn through the inlet pipe 10, the preheating chamber 11 and the connecting pipe 12 to the vaporizing chamber 5, and is further passed through the combustion chamber 6, the heat exchanger 7, the exhaust gas unit 8 and the exhaust gas pipe 9 to the atmosphere.

A portion of the air is passed from the inlet pipe 10 through the by-pass pipe 28 directly into the heat-exchanger 7. The pressure switch 34 is turned on by the passing combustion air, whereby electric current is fed to the preheater 13, the vaporizing heater 32 and the temperature detector 33. The combustion air is preheated by the preheater 13 and the wall of the vaporizing chamber 5 is heated by the heater 32. When the wall of the vaporizing chamber 5 is heated to a temperature about 250°C lower than the predetermined temperature, the resistance of the temperature detector made of PTC is suddenly increased to feed electric current to the second relay coil 61 which was in a short circuit condition due to the temperature detector, and the normally OFF switch 62 is turned on, whereby voltage is applied to the electric fuel feed pump 40, the control element 63 and the timer element 64. The voltage is also applied through the normally ON switch 66 of the time element 64 to the ignition transformer 65. Kerosene is fed from the electric pump 40 through the feed pipe 42 onto the rotary plate 14. The kerosene is scattered by the rotary plate 14 in the inner wall of the vaporizing chamber 5 and is vaporized by the heater 32. The vaporized fuel is then mixed with preheated combustion air.

The combustible gas mixture is injected through the flame hole plate 19 into the combustion chamber 6 and is ignited by a discharge arc generated between the ignition electrode 20 and the flame hole plate 19 by the ignition transformer 65, so as to form a flame 68 at the flame hole plate 19. The burning combustion gas is propelled through the multi-apertured combustion plates 22, 23 to the heat-exchanger 7 and is discharged through the exhaust gas unit 8 and the exhaust pipe 9. When combustion is initiated, the delay switch 54 is turned on and the blower 35 is rotated, whereby room air is taken from the inlet 3 of the casing 1 and is passed around the heat-exchanger 7 to make hot air and this hot air is blown into a room from the outlet 2.

At substantially the instant at which the blower 35 is switched on, the normally ON switch 66 is turned off by the timer element 64, and electric circuit to the ignition transformer 65 is broken. The normally OFF switch 67 is turned on to feed electric current through the room temperature detector switch 36 to the electromagnetic coil 30 whereby the switch valve 29 is closed and no further combustion air is passed through the by-pass pipe 28, but the main volume of combustion air is fed directly into the vaporizing chamber 5.

The pump control element 63 is activated by the timer element 64. After the timer has timed out, the electric fuel feed pump 40 is controlled depending upon the condition of flame 68 formed on the flame hole plate 19. That is, the equivalent circuit of the diode 70, variable resistance 71 and the resistance 69 of FIG. 6 is formed by the flame between the flame detecting electrode 21 and the flame hole plate 19.

When the flame 68 is decreased to cause a back-fire, the flame current is increased, and the potential difference between the input terminals 99, 100 of the operational amplifier 72 is changed so that the potential at terminal 99 is greater than that at terminal 100, whereby the output voltage of the operational amplifier 72 is decreased and the oscillation frequency of the SBS 73 is decreased. The monostable vibrator 74 actuated by the SBS 73 applies a pulse signal having a waveform depending upon the frequency, to the transistor 75 and accordingly, the intermittent on intervals of the transistor 75 are increased, and the feed rate of the liquid fuel by the electric fuel feed pump is decreased. Accordingly, the flame 68 is returned to its normal condition. On the other hand, when the flame 68 is too low, the opposite operation is performed and the feed rate of the liquid fuel by the electric pump is increased. Accordingly, the flame 68 is again returned to its normal condition.

Figure 7:
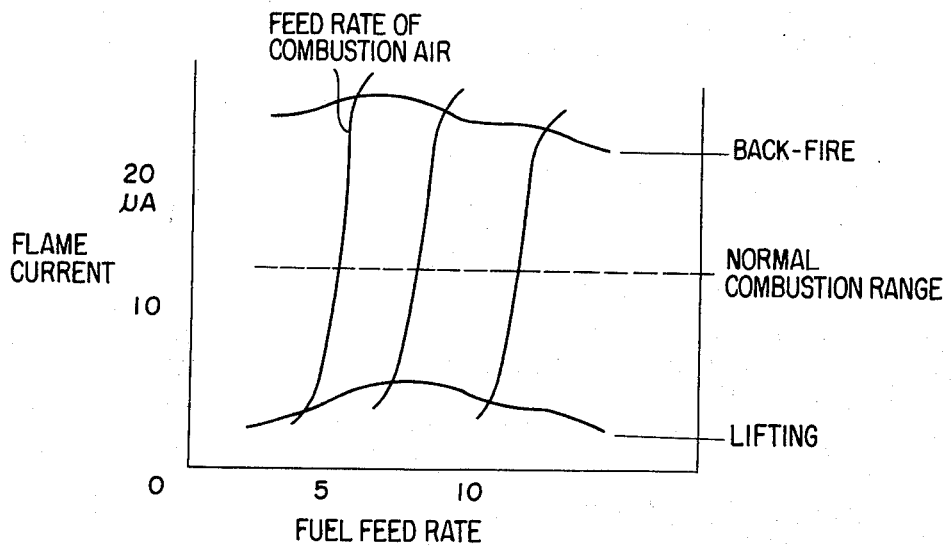

The resistance of the pump control element 40 is selected so as to be stable at the position shown by the dotted line of FIG. 7 when in operation. When the flame 68 has gone out, no voltage is applied between the input terminals 99, 100 of the operational amplifier 72. When this voltage becomes zero, the output of the operational amplifier 72 is high, whereby the gate voltage of the transistor 76 is applied through the constant voltage diode 98 and the transistor 76 is turned on while the transistor 77 is turned off. The contact 79 of FIG. 5, in the ON state due to the relay coil 78, is turned off to break the circuit to the motor 17 and other components.

When the room air is heated above a predetermined temperature, the room temperature detector switch 36 is turned off to break the flow of current to the electromagnetic coil 30 and the valve 29 is opened to pass a part of the combustion air through the by-pass pipe 28 directly to the heat-exchanger 7. The feed rate of the combustion air to the vaporizing chamber 5 is also decreased, whereby the flame 68 formed at the flame-hole plate 19 is decreased to cause back-fire. Accordingly, the fuel feed rate of the electric fuel feed pump 40 is decreased corresponding to the feed rate of the combustion air by the pump control element 63, and the air heating coefficient is decreased by the blower. In same manner, the degree of opening of the valve 29 is shifted by the room temperature detector switch 36 to keep the room at the predetermined temperature.

When the heating is stopped for a while, the degree of opening of the damper 31 in the inlet pipe 10 is decreased by hand whereby the feed rate of the combustion air fed into the vaporizing chamber 5 is decreased before reaching the valve 29 regardless its setting; and accordingly the fuel feed rate of the electric pump 40 is decreased to form only small flame 68 which is an ignition or pilot flame. When the damper 31 is again fully opened, heating is immediately started.

During combustion, the combustion air is preheated through the wall of the combustion chamber 6 when the air is passed through the preheating chamber 11, whereby the air can be kept at a predetermined temperature without preheating it with the preheater 13. The wall of the vaporizer 5 is also heated by the heat of the wall of the combustion chamber 6 and is heated to the predetermined temperature without need for heating the wall of the vaporizing chamber with the vaporizing heater 32. Under these conditions, the preheater 13 and the vaporizing heater 32 made of positive temperature characteristic resistance material PTC are not heated because the resistance is increased and the current is decreased. As a result, the combustion air is kept at about 80°C and the inner wall of the vaporizer 5 is kept at about 250°C. The current fed to the second relay coil 61 is decreased. When the second relay coil is selected as one which is not turned off by the contact 62 after actuation unless no current is supplied, the contact 62 is not turned off even though the resistance of the heater 13 and the heater 32 are highly increased to decrease the current.

In accordance with the invention, the electric fuel feed pump is connected through the ignition control element to the power source for intermittent control of pump. Accordingly, it is possible to deliver fuel at a very slow rate (such as 0.3 – 0.08 cc/second) from the fuel tank to the vaporizing chamber of the combustion apparatus using a commercialized fuel electric pump having a simple structure, and it is also possible to provide a compact hot air heating apparatus having a heating coefficient of about 8000 – 2000 Kcal/hour, which is suitable for using in a home or room. In accordance with the invention, the electric fuel pump is intermittently driven by a control which detects or senses the flame in the combustion chamber. Accordingly, it is possible to use this device for controlling the electric fuel pump at relatively low fuel feed rates and to use the device for controlling the flame in the combustion chamber for maintaining normal combustion conditions and normal operation. This is in contrast to conventional devices which keep the flame in the normal combustion condition by detecting the flame in the combustion chamber and controlling the combustion air flow. In accordance with the invention, the electric fuel pump feeds the liquid fuel from the fuel tank to the combustion chamber under intermittent drive control by detecting the flame condition in the combustion chamber while a damper is disposed in the combustion air passage. Accordingly, when combustion is temporarily stopped, the feed rate of the combustion air can be minimized by shifting the damper to the position at which it passes the minimum air, whereby the feed rate of the liquid fuel is automatically minimized. It is possible to change the combustion condition from normal combustion to only an ignition or pilot flame by controlling the damper.

Moreover, in accordance with the invention, the electric fuel pump is intermittently driven by detecting the combustion flame and a valve is disposed in the combustion air passage to selectively switch the valve automatically between open and closed positions by a room air temperature detector. Accordingly, it is possible to maintain a predetermined room air temperature and to control the heating coefficient to a desired value and also to control the flame in the combustion chamber by automatically controlling the feed rate of the combustion air depending upon the temperature of the room air and automatically controlling the fuel feed rate depending upon the combustion air to control the heating coefficient.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A vaporizing type liquid fuel combustion apparatus comprising:
   a vaporization chamber for vaporizing a liquid fuel,
   a combustion chamber coupled to said vaporization chamber for receiving fuel and for forming vaporized fuel,
   a fuel tank,
   an electric pump coupled to said fuel tank and to said vaporization chamber for feeding fuel from said tank to said vaporization chamber,
   blower means coupled to said combustion chamber for feeding a mixture of air and vaporized fuel into said combustion chamber,
   pump control means coupled to said electric pump for intermittently driving said pump in response to flame temperature in said combustion chamber,
   said pump control means including a control element for supplying an AC voltage so that the average feed rate of said pump is between 0.3 and 0.08 cc/second.

2. An apparatus as in claim 1, further comprising:
   a flame detector in said combustion chamber for detecting the condition of a flame therein; and wherein
   said control element is coupled to and controlled by said flame detector for controlling said pump in accordance with the condition of said flame in said combustion chamber.

3. An apparatus as in claim 2 further comprising:
   a structure including a passage for combustion air couple to said combustion chamber,
   an adjustable damper positioned in said passage,
   damper control means coupled to said damper for controlling the position thereof; and,
   said pump control means being responsive to closure of said damper for reducing the fuel feed rate when the flow of combustion air is reduced so that said flame is reduced to the level of a pilot flame.

4. An apparatus as in claim 3, further comprising:
   an air passage by-pass valve; and, a temperature detector coupled to said by-pass valve for regulating air flow therethrough,
   whereby the fuel feed rate is automatically controlled to maintain a predetermined temperature.

* * * * *